W. V. TURNER.
ELECTRICALLY CONTROLLED BRAKE.
APPLICATION FILED OCT. 3, 1914.
1,214,615.
Patented Feb. 6, 1917.
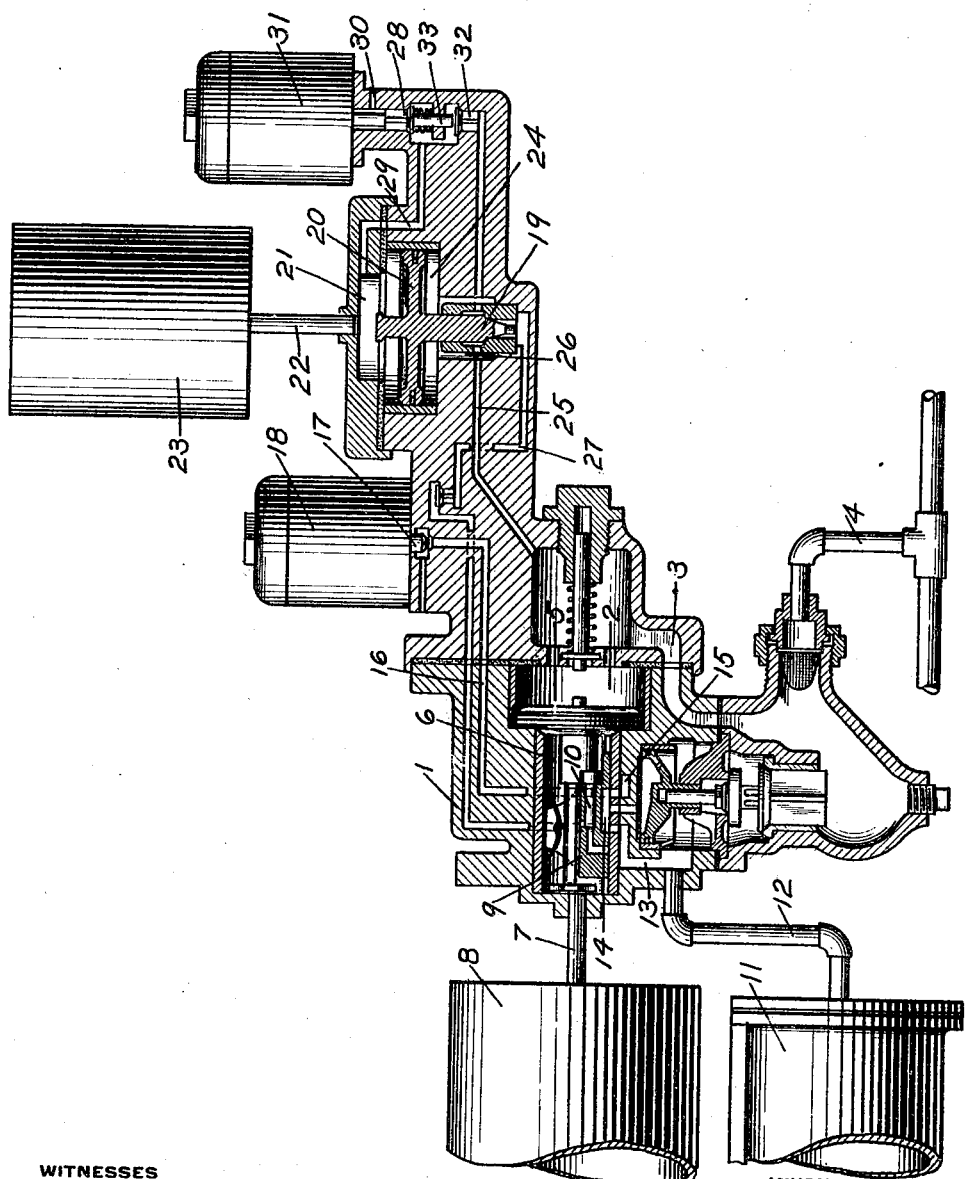
WITNESSES
H. W. Crowell.
G. M. Clements.
INVENTOR
Walter V. Turner
by Wm. N. Cady
Att'y.

UNITED STATES PATENT OFFICE.

WALTER V. TURNER, OF EDGEWOOD, PENNSYLVANIA, ASSIGNOR TO THE WESTINGHOUSE AIR BRAKE COMPANY, OF WILMERDING, PENNSYLVANIA, A CORPORATION OF PENNSYLVANIA.

ELECTRICALLY-CONTROLLED BRAKE.

1,214,615.   Specification of Letters Patent.   Patented Feb. 6, 1917.

Application filed October 3, 1914. Serial No. 864,873.

*To all whom it may concern:*

Be it known that I, WALTER V. TURNER, a citizen of the United States, residing at Edgewood, in the county of Allegheny and State of Pennsylvania, have invented new and useful Improvements in Electrically-Controlled Brakes, of which the following is a specification.

The invention relates to electro-pneumatic brakes, and more particularly to a brake apparatus in which the brakes are applied by electrically venting fluid from the brake pipe.

The principal object of my invention is to provide means for limiting the maximum rate of reduction in brake pipe pressure to a predetermined degree.

The single figure of the accompanying drawing is a sectional view of an electro-pneumatic brake equipment for a car with my improvement embodied therein.

The brake equipment may comprise a triple or equalizing valve device 1 having a piston chamber 2, connected by passage 3 to brake pipe 4, and containing piston 5, and a valve chamber 6, connected by pipe 7 to auxiliary reservoir 8 and containing the usual main slide valve 9 and graduating valve 10. The brake cylinder 11 is connected by pipe 12 to the usual brake cylinder passage 13 which in release position of the slide valve 9 is connected by cavity 14 with exhaust port 15.

For electrically controlling the release of the brakes, the exhaust port 15 may connect to a passage 16 controlled by a valve 17 which is adapted to be actuated by a magnet 18.

According to my invention, the venting of fluid from the brake pipe is controlled by an equalizing discharge valve 19 adapted to be actuated by a piston 20 having the chamber 21 at one side connected by pipe 22 to an equalizing reservoir 23 and having the chamber 24 at the opposite side in constant communication with the brake pipe through passage 25 and annular chamber 26. The valve 19 is adapted to vent fluid from the brake pipe to a passage 27 leading to brake cylinder passage 13, or said valve may be arranged to vent fluid directly to the atmosphere.

The operation of the equalizing discharge valve is controlled by a pilot valve 28 adapted to vent fluid from the equalizing reservoir side of the piston 20 through passage 29 to exhaust port 30, and the pilot valve is controlled by a magnet 31. The equalizing reservoir is charged by way of passage 25, past a check valve 32, and through passage 29.

In operation, when the brake pipe 4 is charged with fluid under pressure, fluid also flows through passage 25 lifting check valve 32 to passage 29, thus charging the equalizing reservoir 23.

If it is desired to effect an application of the brakes electrically, the magnet 31 on each car is energized so as to open the valve 28. Fluid is thereupon vented from the equalizing reservoir to exhaust port 30 and since the volume of the reservoir and the size of the exhaust port 30 are constant, the pressure in the equalizing reservoir will be reduced at a predetermined rate. The drop in pressure in chamber 21 causes the piston 20 to lift the valve 19, so that fluid is vented from the brake pipe. When the desired application has been made, the brake valve is turned to lap position, and the magnet valve 28 is closed, thus cutting off further venting of fluid from the equalizing reservoir. As soon as the pressure in the brake pipe has dropped slightly below the pressure in the equalizing reservoir, the excess pressure on the reservoir side operates the piston 20 to close the valve 19. It should be noted that when the valve 28 is opened, a stem 33 thereon comes into engagement with check valve 32 and thus holds the same closed, so that the equalizing reservoir is now separated from the brake pipe. If, while the magnet valve 28 is open, there should be a brake pipe leakage which with the reduction in brake pipe pressure intentionally made should exceed the desired maximum service rate, then the excess pressure in chamber 21 will operate the piston 20 to partially or wholly close the discharge valve 19, thus restricting the rate of brake pipe reduction to the predetermined rate at which the equalizer reservoir is being reduced through the exhaust port 30.

Having now described my invention, what I claim as new and desire to secure by Letters Patent, is:—

1. In an electro-pneumatic brake, the combination with a train brake pipe, of an apparatus on a car of a train comprising an equalizing reservoir, an equalizing discharge valve device subject on one side to equalizing reservoir pressure for locally venting fluid from the brake pipe, and an electrically controlled valve for venting fluid from the equalizing reservoir side of the discharge valve device.

2. In an electro-pneumatic brake, the combination with a train brake pipe, of an apparatus on each car of a train comprising an equalizing reservoir, a piston subject to the opposing pressures of the brake pipe and the equalizing reservoir, a valve operated by said piston for venting fluid from the brake pipe at each car, and an electrically controlled pilot valve for venting fluid from the equalizing reservoir side of the piston.

3. In an electro-pneumatic brake, the combination with a brake pipe, of an apparatus on each car of a train comprising an equalizing reservoir, a piston subject to the opposing pressures of the train brake pipe and the equalizing reservoir, a valve operated by said piston for locally venting fluid from the brake pipe, a pilot valve for venting fluid from the equalizing reservoir side of the piston at a predetermined rate, and a magnet for operating said valve.

4. In an electro-pneumatic brake, the combination with a brake pipe, of an apparatus on the car comprising an equalizing reservoir, a piston subject to the opposing pressures of the brake pipe and the equalizing reservoir, a valve operated by said piston for venting fluid from the brake pipe at the car, a normally closed check valve for controlling communication through which the equalizing reservoir is charged, and an electrically controlled pilot valve for venting fluid from the equalizing reservoir side of the piston and adapted in open position to hold said check valve closed.

In testimony whereof I have hereunto set my hand.

WALTER V. TURNER.

Witnesses:
A. M. CLEMENTS,
S. W. KEEFER.

Copies of this patent may be obtained for five cents each, by addressing the "Commissioner of Patents, Washington, D. C."